United States Patent [19]

Saitou

[11] Patent Number: 5,077,551
[45] Date of Patent: Dec. 31, 1991

[54] DISPLAY PANEL OPEN/CLOSED DETECTION MECHANISM, AND PORTABLE ELECTRONIC APPARATUS USING THE SAME

[75] Inventor: Yosio Saitou, Oome, Japan

[73] Assignee: Kabushiki Kaisha Toshiba, Kawasaki, Japan

[21] Appl. No.: 442,784

[22] Filed: Nov. 29, 1989

[30] Foreign Application Priority Data

Nov. 30, 1988 [JP] Japan .......................... 63-156009[U]

[51] Int. Cl.⁵ ............................................. G09G 1/00
[52] U.S. Cl. .................................. 340/700; 364/708; 200/61.7
[58] Field of Search ................ 364/708; 340/700, 545; 248/917, 918, 919; 361/394, 386; 200/61.7; 250/229

[56] References Cited

U.S. PATENT DOCUMENTS

| 4,150,265 | 4/1979 | Holden | 200/61.7 |
| 4,571,456 | 2/1986 | Paulsen et al. | 361/386 |
| 4,742,478 | 5/1988 | Nigro, Jr. et al. | 364/708 |
| 4,841,283 | 6/1989 | Bubliewicz | 340/545 |

Primary Examiner—Ulysses Weldon
Assistant Examiner—Darin Miller
Attorney, Agent, or Firm—Oblon, Spivak, McClelland, Maier & Neustadt

[57] ABSTRACT

A portable computer includes a main body containing a large number of electronic parts, a display panel including a flat display device and pivotal between a first position overlapping the main body and a second position separated from the main body, a hinge mechanism for pivotally coupling the main body and the display panel, a lock mechanism which non-pivotally locks the main body and the display panel at the first position of the display panel, and can be manually released, and a photosensor unit for detecting the position of the display panel with respect to the main body so as to cut off power supply to the display panel when the display panel is located at the first position, and to allow power supply to the display panel when the display panel is located at the second position.

6 Claims, 3 Drawing Sheets

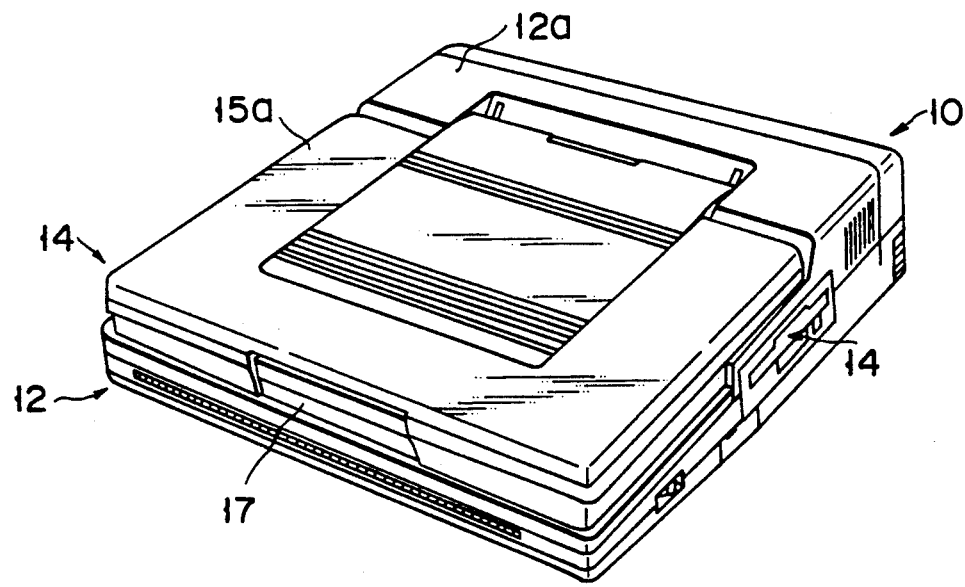
F I G. 1
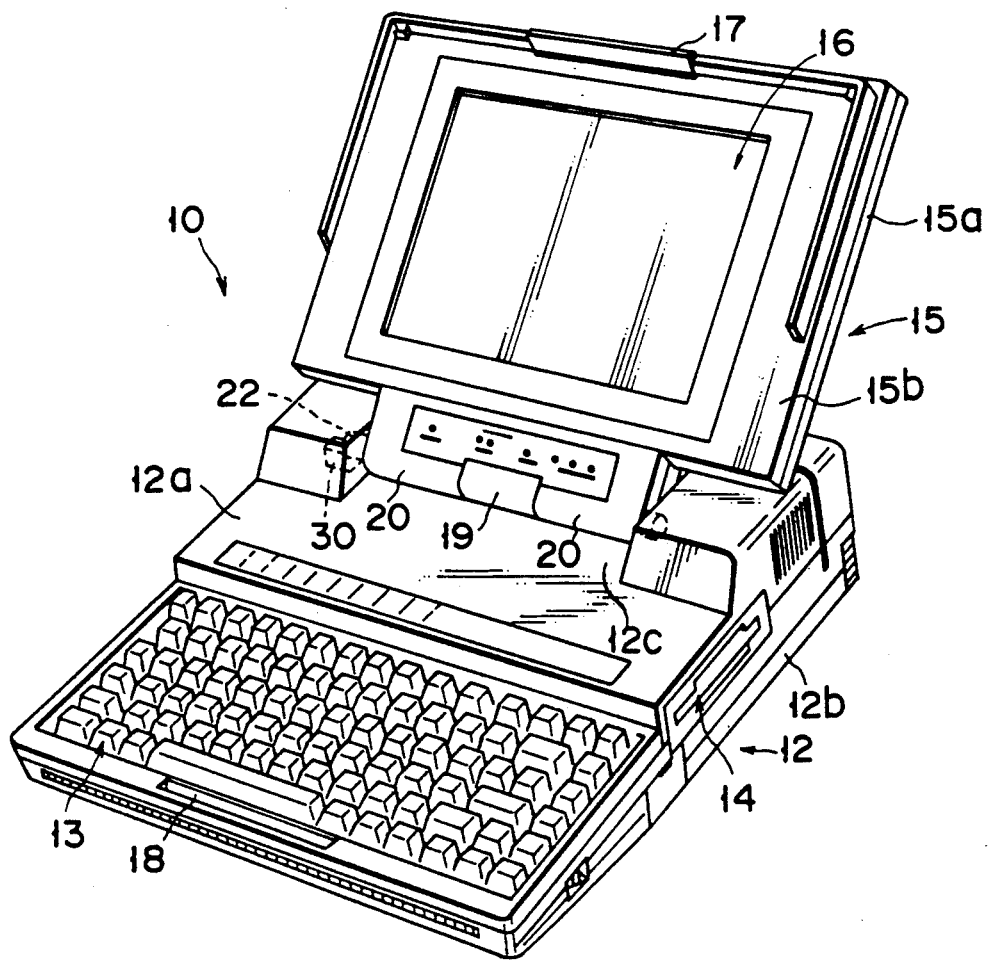
F I G. 2

DISPLAY PANEL OPEN/CLOSED DETECTION MECHANISM, AND PORTABLE ELECTRONIC APPARATUS USING THE SAME

BACKGROUND OF THE INVENTION

1. Field of the Invention

The present invention relates to a display panel position detection mechanism used in a portable electronic apparatus such as a lap-top personal computer, and especially in an electronic apparatus having a display panel which is opened when the apparatus is to be used and closed when it is not in use.

2. Description of the Prior Art

In the field of personal computers, so-called laptop computers have been developed which are compact, lightweight, and portable This type of computer comprises a display panel housing a flat-panel display such as a plasma display, an LCD (liquid crystal display), or the like, pivotally mounted on the computer main body, which includes a keyboard, a floppy disk drive unit, and the like, by means of a hinge mechanism.

When not in use, the display panel is folded down onto the main body by way of the hinge mechanism and secured in place by a lock mechanism. This allows easy carriage of the computer. When the computer is to be used, the lock mechanism is released, and the display panel can be pivoted upward to a viewing angle best suited to the operator.

When data is displayed, the display surface of the flat panel display device generates heat. At this time, if the display panel of this type of computer is folded onto the main body, heat generated from the display surface is filled between the main body and the display surface, since the display panel is almost completely shut, the heat adversely affecting the display panel and the main body. In addition, displaying data on the folded display panel results in waste of energy.

SUMMARY OF THE INVENTION

The present invention has been developed to eliminate the above-described drawbacks of the conventional device, and its object is to provide a portable computer, which prevents wasteful energy consumption.

In order to achieve the above object of the present invention, there is provided a portable apparatus which comprises a main body containing a large number of electronic parts, a display panel including a flat-screen display device and pivotal between a first position overlapping the main body and a second position separated from the main body, means for pivotally coupling the main body and the display panel, a lock mechanism which locks the main body and the display panel together at the first position, and can be manually released, and detection means for detecting the position of the display panel with respect to the main body so as to cut off the power supply to the display panel when the display panel is located at the first position, and to allow power to be supplied to the display panel when the display panel is located at the second position.

Furthermore, according to the present invention, there is provided a lap-top computer including a main body containing a large number of electronic parts and a keyboard, and a display panel having a flat display device and pivotal between a first position overlapping the main body and a second position separated from the main body. The computer comprises a top cover, arranged adjacent to the keyboard, for covering an upper portion of the main body, an outer cover for supporting at least one side of the display device, cam means pivotally supported on the top cover and actuated by movement of the outer cover, and a photosensor unit, including a light shielding segment actuated by movement of the cam means, and a U-shaped photointerrupter having a laser beam path which is shielded by the light-shielding segment when the display panel is moved to the second position, for outputting an information signal indicative of the position of the display panel, so as to cut off the power supply to the display panel when the display panel is located at the first position, and to allow power supply to the display panel when the display panel is located at the second position.

According to another aspect of the present invention, there is provided a mechanism pivotally supported on the main body of a lap-top computer containing, a large number of electronic parts, for detecting the pivot position of a display panel including a flat display device and pivotal between a first position overlapping the main body and a second position separated from the main body. The detection mechanism comprises a shaft which is pivotally supported inside the main body and one end of which projects outward from the main body and is fixed to the display panel, and means arranged in the main body, for detecting the position of the display panel through the shaft.

According to still another aspect of the present invention, there is provided a display panel opening/closing detection mechanism contained in an electronic apparatus having a display panel which is pivotally coupled to a main body by means of a hinge mechanism. The detection mechanism comprises a shaft provided to the main body, and having a first end portion pivotally supporting the display panel, a second end portion on which a cam is mounted and rotated upon pivotal movement of the display panel, and a photosensor unit including a sensor shaft moved vertically by the cam, a light-shielding segment provided to the sensor shaft, and a photointerrupter having a light path which can be shielded by the light shielding segment, for outputting an information signal indicative of the position of the display panel.

BRIEF DESCRIPTION OF THE DRAWINGS

Other features and advantages of the present invention will be apparent from the description of the embodiments taken in conjunction with the accompanying drawings, of which:

FIG. 1 is a perspective view of a lap-top personal computer with the display panel folded down, and which employs a display panel opening/closing detection apparatus according to an embodiment of the present invention;

FIG. 2 is a perspective view of the computer shown in FIG. 1, with the display panel open;

DETAILED DESCRIPTION OF THE PREFERRED EMBODIMENTS

Figure 3:
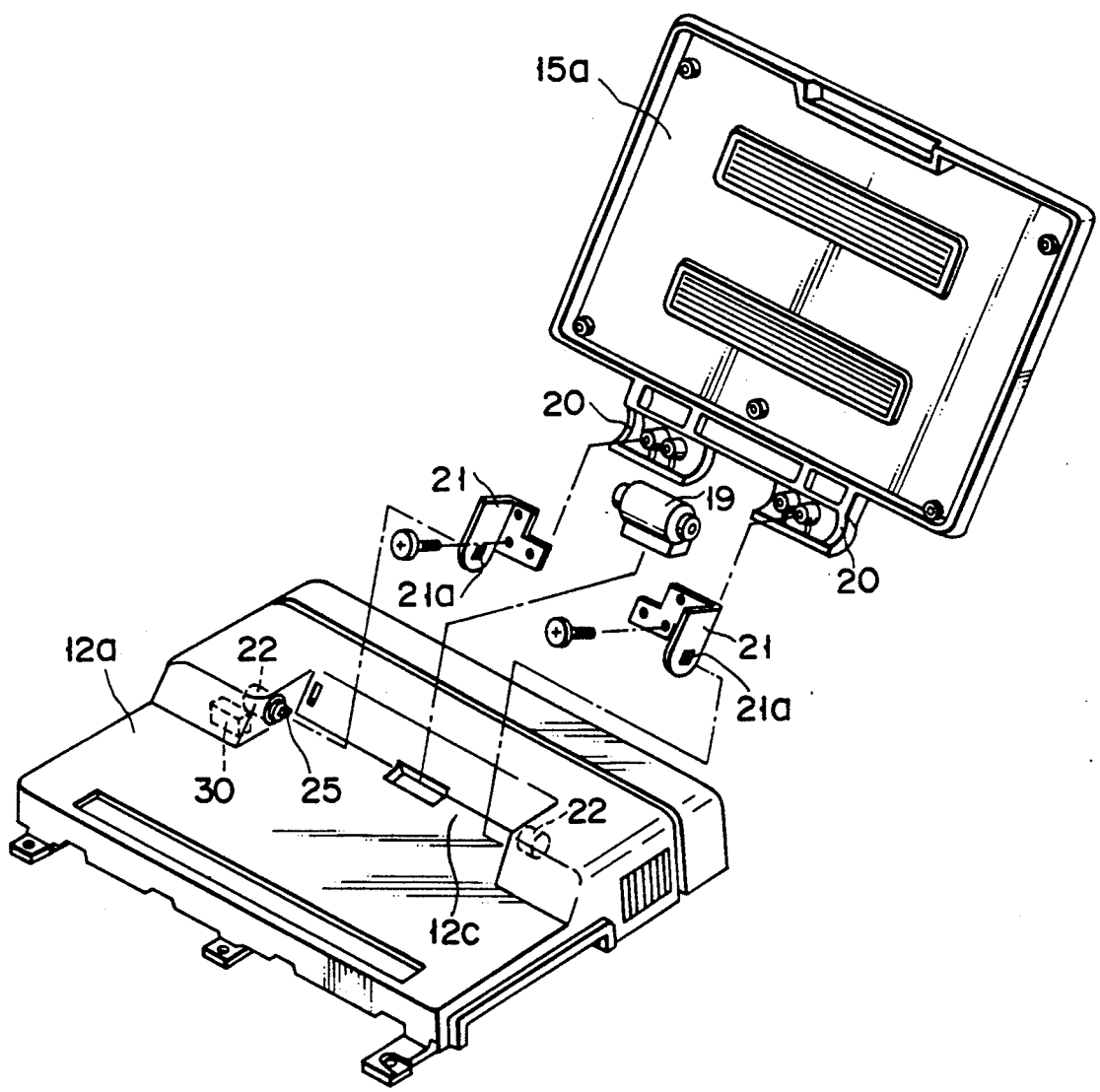
FIG. 3 is an exploded perspective view showing the mounting relationship between the display panel and the main body of the computer shown in FIG. 1.

FIGS. 1 and 2 show a lap-top type personal computer 10 having a display panel open/closed detection mechanism according to an embodiment of the present invention. The computer 10 comprises a main body 12 and a display panel 15 pivotally supported to the main body 12 through a hinge 19. The main body 12 has a top cover 12a including a supporting surface 12c, on which the display panel 15 is supported, and a bottom cover 12b to which a keyboard 13 and floppy disk drive 14 are fixed. The display panel 15 comprise a flat panel display unit 16, an outer cover 15a for housing the display unit 16, and an inner cover 15b having a display window. The display panel 15 also comprises leg portions 20, 20 which pivotally connects the display panel 15 to the main body 12.

The display panel 15 and the main body 12 are respectively provided with a latch 17 and a notch 18 which interlock with each other. When the display panel is in the closed position so as to cover keyboard 13 as shown in FIG. 1, the latch 17 is engaged with the notch 18. In this state, when an operator presses the latch 17, the engagement between the latch 17 and the notch 18 is released. When the engagement is released, the display panel can be desirably pivoted on the hinge 19. Thus, the display panel can be pivoted between the closed position and an open position where the operator can operate the keyboard 13 while watching the flat panel display unit 16. The main body 12 comprises a hop-up device for slightly hopping up the display panel 15 when the engagement between the latch 17 and the notch 18 is released. The main body 12 comprises an axle lock device 22 for setting the display panel to an open position at a desired angle. In this embodiment, the hop-up device is provided in the axle lock device 22. A flexible cable for electrically connecting the display panel 15 to the main body 12 is led from the main body 12 through a cable duct in hinge 19 to the display panel 15.

As is shown in FIG. 3, brackets 21, 21 are fixed to the leg portions 20, 20. On both sides of the wall of the supporting surface 12c, axle lock devices 22, 22 are mounted. The axle lock devices 22, 22 respectively have projections 25, 25 having a substantially rectangular shape. The projections project over the supporting surface 12c. The brackets 21, 21 respectively have substantially rectangular holes 21a, 21a. Each of the projections is inserted into one of the holes. These axle lock devices 22, 22 and the brackets 21, 21 respectively have substantially the same structures. Therefore, one axle lock device 22 and one bracket 21 will be explained below. Note that the axle lock device 22 and the bracket 21 may be provided at only one side of the wall of supporting surface 12. However, they are preferably provided at both sides of the wall to allow smooth operation of the display panel 15.

Figure 4:
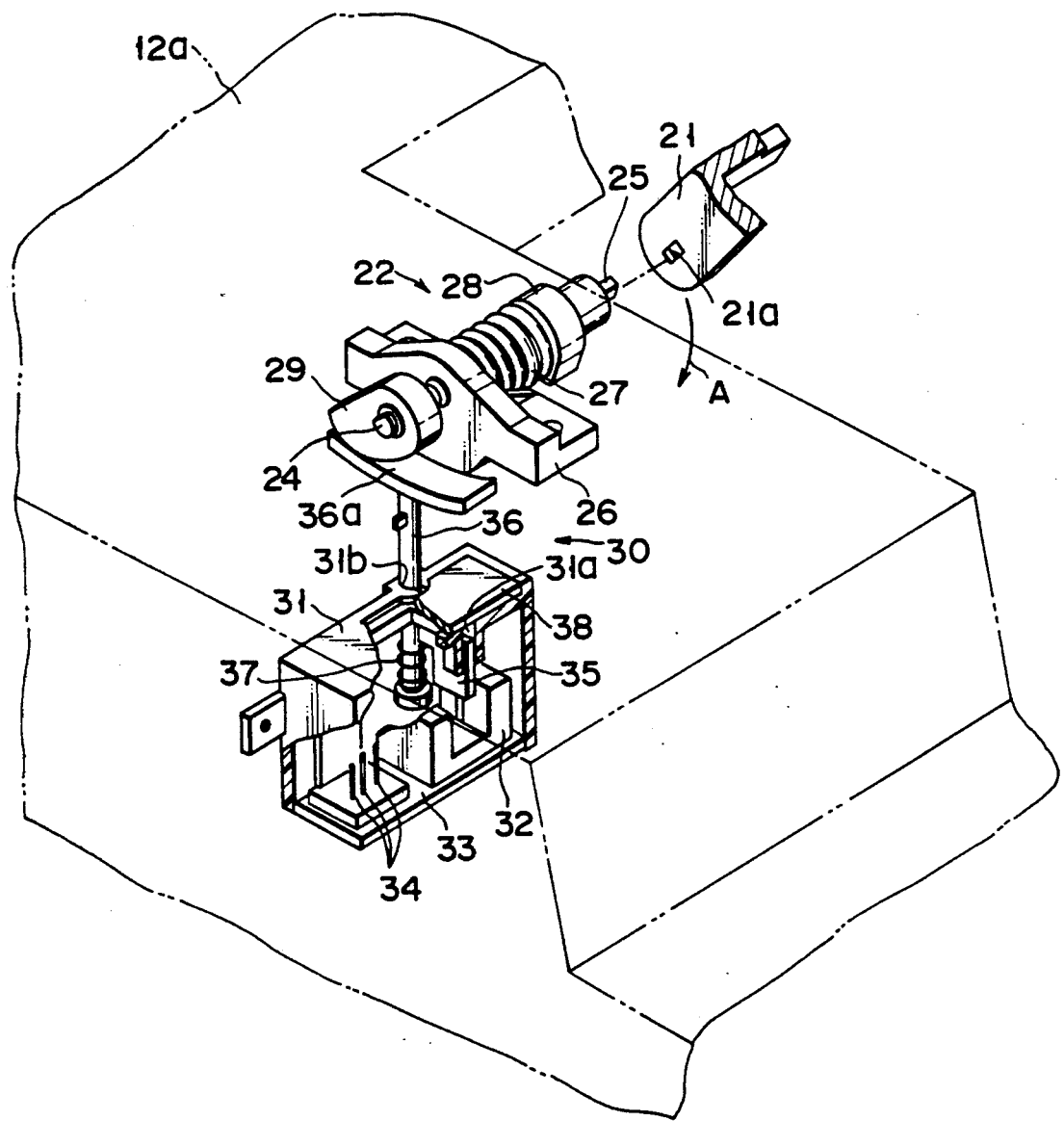
FIG. 4 is a perspective view showing the display panel opening/closing detection apparatus according to the embodiment of the present invention.

As shown in FIG. 4, the axle lock device 22 comprises a shaft 24, a shaft support member 26 on which the shaft is rotatably mounted and which is fixed on the inner surface of the top cover 12a by a preferable means such as a screw, a coil spring 27 one end of which is fixed to the shaft support member, and a spring retainer 28, fixed on the shaft 24, for supporting the other end of the spring. A projection 25 having a substantially rectangular shape complementary with the hole 21a of the bracket is formed on an inner end portion of the shaft 24, i.e., an end portion opposing the bracket 21 fixed to the mounting portion 20 of the display panel 15. When the axle lock device 22 is assembled to the top cover 12a, the projection 25 projects inwardly from the side wall of mounting surface 12c of the outer cover (FIG. 3), and is securely fitted in the hole 21a of the bracket 21 fixed to the outer cover 15a. The projection 25 and the hole 21a of the bracket may have any shapes as long as they have complementary shapes and can be meshed with each other to prevent rotation.

The operation of the axle lock device 22 is as follows.

When the display panel 15 is folded on the main body 12 after the main body 12 and the display panel 15 are assembled, the shaft 24 is rotated in a direction of an arrow A shown in FIG. 4. One end of the spring 27 is held by the support member 26 fixed to the top cover 12a, and the other end is held by the spring retainer 28 fixed to the shaft 24. Therefore, when the spring 27 is deformed upon rotation of the shaft 24, a restoration force is accumulated in the spring. Therefore, when the latch 17 and the notch 18 are engaged with each other (FIG. 1), the latch 17 is pressed to release engagement with the notch 18. Therefore, the spring 27 of the hop-up device 22 hops up the display panel 15 about the hinge 19 by the accumulated energy.

As shown in FIG. 4, a device 30 for detecting an opening/closing state of the display panel 15 is arranged in the main body 12.

In this embodiment, the device comprises a photosensor unit 30. The photosensor unit 30 is operated by a cam 29 fixed to an outer end portion of the shaft 24 of the hop-up device 22, i.e., opposite end portion of the projection 25, in this embodiment.

The photosensor unit 30 comprises a housing 31 fixed to the top cover 12a, a U-shaped photointerrupter 32 housed in the housing, a printed circuit board 33 for fixing the photointerrupter, I/O terminals 34 for the photointerrupter fixed to the printed circuit board, and a light shielding segment 35 which can be inserted between the two leg portions of the U-shaped portion of the photointerrupter by the cam 29. This photointerrupter 32 is a conventional one, and has a laser emitting means provided to one leg portion of the U-shaped portion, and a light-receiving means provided to the other leg portion. Thus, the photointerrupter 32 detects whether or not a laser beam path formed between the two leg portions is shielded by the light shielding segment 35. The light shielding segment 35 is coupled to a rod 36 having a cam receiving portion 36a at top end. A smooth, concave sliding surface on which the cam 29 slides is formed on the cam receiving portion 36a. The rod 36 is biased by a spring 37 arranged in the housing 31 in a direction to cause the cam receiving portion 36a to approach the cam 29. Therefore, the light shielding segment 35 can be axially moved together with the rod 36 by the cam 29 between a position for shielding the laser beam path and a position for not interrupting the laser beam path.

As shown in FIG. 4, the housing 31 also has a guide path 31a, matched with the opening of the photointerrupter 32, for guiding the light shielding segment 35, a guide path 31b, communicating with the path 31a, for guiding the rod 36, and a stopper or a lid member 38 for closing the path 31a to prevent the light shielding segment 35 and the rod 36, biased by the spring 37, from being disengaged from the corresponding paths. When the light shielding segment 35 is engaged with the lid member 38, it is located at a position not shielding the laser beam path between the two leg portions of the photointerrupter 32.

The photosensor unit 30 can be fixed to a predetermined position in the top cover 12a after it is assembled in advance. Since the cam receiving portion 36a of the rod 36 actuated by the cam 29 has a smooth, concave surface, precisely accurate alignment with the cam 29 is not required. Therefore, the unit 30 can be very easily assembled. In a state wherein the unit 30 is mounted in the top cover 12a, the cam receiving portion 36a need not always be in contact with the cam 29 at the closed position of the display panel. When the display panel 15 is opened to some extent, the cam 29 need only press the rod 36, so that the light shielding segment 35 can shield the laser beam path of the photointerrupter 32.

When the laser beam path of the photointerrupter 32 is not shielded while the power switch of the computer 10 is kept ON, a signal representing an "unshielded" state is supplied to a display control circuit or a power control circuit through the I/O terminal 34. As a result, display of data is turned off, or power supply to the display panel is ceased. When the laser beam path of the photointerrupter 32 is shielded, a signal representing a "shielded" state is supplied to the display control device or the power control device, with the result that data display is turned on or power is supplied to the display panel.

The operation of the photosensor unit 30 will be described below together with the display panel 15 and the axle lock devices 22.

As shown in FIG. 1, when the display panel 15 of the computer 10 is folded on the main body 12, the shaft 24 of each axle block device 22 is rotated while deforming the spring 27 by the bracket 21 fixed to the outer cover (FIG. 4). The cam 29 fixed to the shaft 24 does not press the rod 36 of the photosensor unit 30 downward. The rod 36 is axially extended by the spring 37, and is locked by the lid member 38. The laser beam path of the photointerrupter 32 is not shielded. Therefore, even when the power switch of the computer 10 is kept ON, power supply to the display panel 15 is stopped.

When the latch 17 is pressed, the display panel 15 is opened by an energy accumulated in the spring 27 of each hop-up device 22. The shaft 24 of the hop-up device 22 is rotated in a direction opposite to the direction of the arrow A in FIG. 4, and the cam 29 fixed to the end portion of the shaft 24 is rotated in the same direction. The rod 36 is pressed through the cam receiving portion 36a against the biasing force of the spring 37, and the light shielding segment 35 coupled to the rod is moved into the opening of the photointerrupter 32. Thus, the laser beam path formed between the leg portions of the photointerrupter 32 is shielded, and power is supplied to the display panel 15 when the power switch of the computer 10 is ON.

The preferred embodiment of the present invention has been described. However, the present invention is not limited to the above embodiment, and is limited by only the scope of the claims.

What is claimed is:

1. A portable computer comprising
    a base unit having a keyboard;
    a display unit pivotally connecting to the base unit, the display unit being rotatable between a closed position for covering the keyboard and an open position for operating the keyboard;
    a rotational shaft for rotating the display unit;
    a cam fixed to the rotational shaft;
    a photosensor having an emitter and a detector; and
    a slide shaft including a first end having a cam receiving plate pushed by the cam and a second end having a shielding plate sliding between a first position for shielding a space between the emitter and the detector when the display unit is in the open position and a second position for opening the space when the display unit is in the closed position.

2. A portable computer according to claim 1 further comprising a spring, fixed to the second end, for returning the shielding plate from the first position to the second position.

3. A portable computer according to claim 1, wherein the cam receiving plate has a concave upper surface for receiving the cam.

4. A portable computer according to the claim 1, wherein the base unit supplies power for driving the display unit to the display unit when the shielding plate is in the second position and the base unit cuts off the power when the display unit is in the first position.

5. A panel opening/closing detection mechanism comprising:
    a base;
    a panel pivotally connecting to the base, the panel being rotatable between a first and a second position relative to the base unit;
    a rotational shaft for rotating the panel;
    a cam fixed to the rotational shaft and having a side surface;
    a photosensor having an emitter and a detector;
    a slide shaft having a first end and a second end;
    a receiving plate fixed to the first end and having an upper surface for receiving the side surface;
    a shielding plate fixed to the second end; and
    the cam pushing the receiving plate and the shielding plate sliding from a third position for opening a space between the emitter and the detector to a fourth position for shielding the space when the panel rotates from the first position to the second position.

6. A panel opening/closing detection mechanism according to claim 5 further comprising a spring, fixed to the second end, generating a return force for returning the shielding plate from the fourth position to the third position when the panel rotates from the second position to the first position.

* * * * *